United States Patent [19]

Merrill

[11] 4,056,492
[45] Nov. 1, 1977

[54] PROCESS FOR THE PRODUCTION OF A BODIED SILICONE RESIN WITHOUT THE USE OF A CATALYST

[75] Inventor: Duane F. Merrill, Ballston Spa, N.Y.

[73] Assignee: General Electric Company, Waterford, N.Y.

[21] Appl. No.: 699,735

[22] Filed: June 24, 1976

[51] Int. Cl.$^2$ .............................................. C08L 91/00
[52] U.S. Cl. .............................. 260/18 S; 260/46.5 R; 260/46.5 G; 260/824 R
[58] Field of Search .................. 260/46.5 R, 18 S, 824

[56] References Cited

U.S. PATENT DOCUMENTS

| | | | |
|---|---|---|---|
| 3,489,782 | 1/1970 | Pruvost et al. | 260/46.5 R |
| 3,865,766 | 2/1975 | Merrill | 260/46.5 R |

*Primary Examiner*—Melvyn I. Marquis
*Attorney, Agent, or Firm*—E. Philip Koltos; D. J. Voss; Frank L. Neuhauser

[57] ABSTRACT

A process for the production of a bodied silicone resin without the use of a catalyst comprising first hydrolyzing the organohydrosilanes in a homogeneous hydrolysis medium composed of water and acetone, removing the acid/water layer, adding at least 10% by weight of water based on the silicone resin hydrolyzate and heating the resulting mixture to at least 130° C and more preferably at a temperature range from 140° C to 160° C. After this bodying step, water constituting at least 10% by weight of the silicone resin hydrolyzate as well as water-immiscible organic solvent may be added to the silicone hydrolyzate and the resulting mixture heated at elevated temperatures so as to remove all the water and acetone. This procedure of adding water may be repeated until the silicone resin hydrolyzate has an acid content that does not exceed 5 parts per million. The silicone resin of the instant case may be prepared as 100% solids or at a concentration of 70 to 95% solids in a water-immiscible organic solvent.

13 Claims, No Drawings

PROCESS FOR THE PRODUCTION OF A BODIED SILICONE RESIN WITHOUT THE USE OF A CATALYST

BACKGROUND OF THE INVENTION

The present invention relates to a process for producing a bodied silicone resin and more particularly the invention relates to producing a bodied silicone resin without the use of a catalyst.

Silicone resins are well known in the art, and specifically those composed of monofunctional units and difunctional units and having a silanol content of anywhere from 0.5% weight or less, to as much as 12%; see for instance Merrill et al., U.S. Pat. No. 3,865,766. Such silicone resins are utilized for a variety of purposes such as electrical protective coatings, the formation of laminates, as a basic constituent in silicone molding compounds, as water repellant coatings, and as intermediates in paints. In certain applications, such as for use in paints and as coatings for electrical encapsulation it is highly desirable that the uncured resin, after it is prepared and before it is utilized, to form the coating or to produce a silicone paint that the silicone resin be bodied; that is, that some of the excess hydroxyl groups be removed from the silicone resin such that it will have a silanol content between 2 to 4% by weight and such that some of the low molecular weight material of the silicone resin interreacts to form high molecular weight silicone resin polymers. This is known as bodying the resin, and various procedures have been set forth for bodying silicone resins.

As stated previously, it is desirable that a silicone resin be bodied for certain applications such that the resin does not have a large amount of low molecular weight material in it if it is to be used in paints or electrical encapsulating coatings. The reason for this is that the bodied silicone resin will have the proper consistency as a coating when it is applied to encapsulate electrical components, so that it will not burn off or drip off the electrical components prior to final cure and so that the silicone paint, specifically silicone polyester resin paints, will have the proper consistency and will cure to its final cure when it is applied to form a coating without the silicone paint running off the surface to which it is applied. There are various procedures for bodying silicone resins for the applications of producing electrical encapsulating coatings and as intermediates for silicone paints. All these various procedures involve the use or addition of a catalyst to the silicone resin and heating the silicone resin at elevated temperatures above 100° C so as to interact and further condense hydroxyl groups from the silicone resin so as to form high molecular weight polymer species in the silicone resin, thus resulting in the bodying of the resin without necessarily the curing of the silicone resin and specifically without the final curing of the silicone resin.

The use of such catalysts being added to the silicone resin for bodying purposes has the disadvantage that these catalysts cannot be removed from the silicone resin and may interfere in subsequent applications of the bodied silicone resin as an intermediate in forming silicone paints or in forming electrical encapsulating coatings in which the silicone resin has to be finally cured with what may be a different type of incompatible catalyst.

In addition, with respect to such bodied silicone resins, which are bodied with the use or addition of a catalyst, it has been found that such silicone resins bodied by prior art methods had the disadvantage that they were insoluble in aliphatic solvents. It is preferred to utilize silicone resins in aliphatic solvents for certain end uses. For instance, in certain geographical locations the use of certain aliphatic solvents is specified for pollution control. Prior art bodied silicone resins were slightly, if at all, soluble in aliphatic solvents. As a result in the use of these boded silicone resins, they had to be dissolved in aromatic solvents which resulted in some difficulties with pollution standards in some parts of the United States.

It is true that there are some alkoxylated silicone resins which show more solubility in aliphatic solvents than the bodied silicone resins of the prior art. However, these silicone resins had to be heavily alkoxylated, that is heavily substituted with alkoxy groups. Even in those cases these alkoxylated silicone resins are not as highly soluble as would be desired in aliphatic solvents. In addition, it should be noted that in many instances in addition to electrical encapsulating and as intermediates in the production of silicone paints it is desired that silicone resins be bodied so as to form high molecular weight polymer species in the silicone resin mixture from as much of the low molecular polymer species as is possible so that substantial quantities of the resin will not volatilize during the curing of the silicone resin at elevated temperatures as is necessitated in many cases. For instance, prior art bodied silicone resins lost as much as 40% of the silicone resin content in volatiles upon being heated at 250° C for any substantial period of time.

It is one object of the present invention to provide a process for bodying a silicone resin without the use of a catalyst.

It is another object of the present invention to provide a process for bodying a silicone resin without the use of a catalyst such that the volatiles given off by the silicone resin upon being heated to 250° C, are substantially less than 40% by weight of the total silicone resin.

It is yet an additional object of the present invention to provide for bodied silicone resins having a silanol content of 2 to 4% by weight which are soluable in aliphatic solvents respective of the presence or absence of alkoxylate groups in the silicone resin.

Other objects of the present invention are accomplished in accordance with the disclosure set forth herein below.

SUMMARY OF THE INVENTION

There is provided by the present invention a process for the production of a bodied silicone resin without the use of a catalyst, comprising (a) adding an organohalosilane to a homogeneous hydrolysis mixture where there is present, per part of organohalosilane, from at least 1.7 to 10 parts of water and from at least 0.2 to 5 parts of acetone and from 0 to about 1 mole of an aliphatic monohydricalcohol having from 1 to 8 carbon atoms per mole of halogen attached to the silicon of the organohalosilane producing a silicone resin hydrolyzate (b) separating an acid water layer from the silicone resin hydrolyzate (c) adding to the silicone hydrolyzate at least 5% by weight of water based on the silicone resin hydrolyzate (d) heating the silicone resin hydrolyzate to at least 130° C; and (e) removing the water and acetone from the silicone resin hydrolyzate to leave the silicone resin wherein the organohalosilane is selected from the group consisting of:

1. organotrihalosilane
2. a mixture of organotrihalosilane and diorganodihalosilane
3. a reaction product of an aliphatic monohydric alcohol having from 1 to 8 carbon atoms and a member selected from the class consisting of organotrihalosilane and a mixture of organotrihalosilane and diorganodihalosilane which reaction product has an average of up to 1 alkoxy radical per halogen radical
4. a mixture of the reaction product of number three and a member selected from organotrihalosilane and diorganodihalosilane, and wherein the organic groups in the organohalosilane and in the silicone resin are selected from the class consisting of monovalent hydrocarbon radicals and halogenated monovalent hydrocarbon radicals.

Preferably, the amount of water that is added in step (c) is about 10% by weight and maybe as much as 100% by weight or more. Most preferably it is between 10% to 40% by weight. Preferably the silicone resin hydrolyzate in step (d) is heated to 140° C and may be heated to as high as 200° C. Most preferably the temperature at which the hydrolyzate is heated in step (d) is between 140° C and 160° C. It is necessary that after step (d) that the silicone resin has an acid content that does not exceed 5 parts per million.

If the acid content exceeds 5 parts per million, the silicone resin has to be washed with water, or refluxed until the acid content of the resin does not exceed 5 parts per million.

Where it is desired that the silicone resin after step (d) be dissolved in aromatic solvent or in an aliphatic solvent for that matter, an amount of water after step (d) that constitutes from 10 to 100% by weight of the silicone resin hydrolyzate as well as from .05 to 3 parts of water-immiscible organic solvent per part by weight of hydrolyzate may be added which may be any water-immiscible organic solvent, such as xylene, toluene, cyclohexane, octane, or heptane. The solvent is added to the silicone resin hydrolyzate along with the water and the mixture is heated to the reflux temperature of the solvent to remove all water and acetone leaving the silicone resin in the solvent at anywhere from 70 to 95% solids. This step may be repeated, i.e., the water and solvent addition after step (d) above, until the acid content of the silicone resin in the water-immiscible organic solvent does not exceed 5 parts per million. It may also be desirable to shorten the process of reducing the acid content by simply filtering the silicone resin and the water-immiscible organic solvent through an alkaline filter so as to reduce the acid content such that it does not exceed 5 parts per million. The reduction of the acid content of the silicone resin is well known to one skilled in the art.

The essence of the present invention lies in the bodying step as disclosed above. Most preferably, there is utilized in the hydrolysis mixture of the present process a mixture of organotrihalosilanes and diorganodihalosilanes such that in the final silicone resin there is formed a silicone resin composed of 10 mole percent of monomethylsiloxy units, 20 mole percent of monophenylsiloxy units, 40 mole percent of dimethylsiloxy units and 30 mole percent of diphenylsiloxy units in which the silicone resin has a silanol content of anywhere from generally 1 to 5% and more preferably from 2 to 4%. It should also be noted along with the bodying step of the instant process, that without the use of the catalyst to produce a unique bodied silicone resin as disclosed above, there is also another important aspect of the present bodied process which is the initial hydrolysis of the organohalosilane which takes place in a homogeneous hydrolysis mixture in which there is present only acetone and water to which the organohalosilane are added.

DESCRIPTION OF THE PREFERRED EMBODIMENT

The organo groups in the organotrihalosilanes and whether it be an organotrihalosilane or diorganodihalosilane or the reaction product of such organotrihalosilane with an alcohol, such organo groups are broadly selected from monovalent hydrocarbon radicals and halogenated monovalent hydrocarbon radicals, preferably not exceeding 10 carbon atoms. Accordingly, the organo groups can be selected from alkyl groups of 1 to 10 carbon atoms such as methyl, ethyl, propyl, and alkenyl, substituent groups of 2 to 10 carbon atoms such as vinyl, alkyl, mononuclear aromatic radicals such as phenyl, methylphenyl and so forth; fluorinated alkyl radicals and more specifically fluorinated alkyl radicals of 1 to 10 carbon atoms such as trifluoropropyl.

Most preferably, the organo groups in the above halosilanes that are reacted in the instant process are selected from methyl, ethyl, phenyl, vinyl and trifluoropropyl the organo groups most preferred being methyl, and phenyl. Although the present silicone resin may contain alkoxy groups, in the most preferred form, the organohalosilane reactant does not contain any alkoxy groups nor is there added any alcohol during the reaction in the homogeneous hydrolysis mixture to form alkoxy groups on the silicone resin product. However, such inclusion of alkoxy groups in the final silicone resin product through the use of a reaction product, alkoxylated organohalosilane, reactant is possible.

One advantage of having such alkoxy groups in the silicone resin product is that such alkoxy groups facilitate the soluability of the bodied silicone resin produced by the instant process in aliphatic solvents.

The halogen in the organohalosilane is most preferably chlorine as is well known to silicone producers. Most preferably to produce the most preferred silicone resin within the instant case the silicone resin organohalosilane reactants are composed of 10 mole percent of monomethyltrichlorosilane; 20 mole percent of monophenyltrichlorosilane; 40 mole percent of dimethyldichlorosilane and 30 mole percent of diphenyldichlorosilane.

The basic hydrolysis of the organohalosilane to produce a bodied resin of the instant case takes place in a homogeneous hydrolysis medium composed of water and as a stabilizing agent, acetone. The organohalosilane is added, which may be a mixture of organohalosilanes, to the water and acetone to produce initial hydrolysis. This addition process of the organohalosilane may be carried out in any number of ways, i.e., the organohalosilanes may be added to the total amount of water and acetone in the hydrolysis vessel or part of the acetone may be added along with the organohalosilane as the organohalosilanes are introduced into the hydrolysis mixture such that the organohalosilanes come into contact with the added portion of the acetone, at about the time that the organohalosilanes and the acetone reach the acetone, water hydrolysis medium.

Generally, per part of organohalosilanes or mixtures of organohalosilanes there must be present from 1.7 to 10 parts of water and from at least 0.2 to up to 5 parts of acetone in the total hydrolysis medium. Optionally, there may be present from 0 to about 1 mole of an aliphatic monohydric alcohol having from 1 to 8 carbon atoms per mole of halogen attached to the silicones of the organohalosilanes. Preferably, the organohalosilanes are added slowly to the hydrolysis medium such that during the addition process in which there is accomplished hydrolysis and during which heat is given off the temperature of the hydrolysis medium is maintained between 20° C to 80° C. It is preferred that the hydrolysis medium be maintained as close as possible to room temperature since at temperatures approaching 80° C or above the reaction becomes violent and the production of the resin becomes unstable. There is one disadvantage to carrying out the hydrolysis at the elevated temperatures above the limits set forth above. The silicone resin hydrolyzate that is produced in the hydrolysis medium may gel.

It should be pointed out here that the organohalosilanes or mixtures of the organohalosilanes may be composed of various organohalosilanes. Specifically, the organohalosilane may be selected from an organotrihalosilane a mixture of organotrihalosilane and diorganodihalosilane, or a reaction product of an aliphatic monohydric alcohol having from 1 to 8 carbon atoms and a member selected from the class consisting of organotrihalosilane and a mixture of organotrihalosilane and diorganodihalosilane which reaction product can have substituted in it up to 1 alkoxy radical per halogen radical; which means at a maximum the reaction product can have all the halogen groups replaced by alkoxy groups. Thus, the initial reaction product may be partially alkoxylated or may be completely halogenated irrespective of whether it is a mono-organo or a diorganosilane reactant.

It should be noted that silicone resins within the scope of the instant invention can be produced where the reactant is solely a mono-organosilane reactant. However, silicone resins cannot be produced within the scope of the instant invention where the reactant is totally a diorganosilane. However, they can be utilized as reactants as a mixture containing mono-organosilanes and diorganosilanes.

In accordance with the instant process, there is produced a resin where the organo to silicone ratio may vary anywhere from 1.0 to 1.9 to 1 and preferably varies from 1.1 to 1.9 to 1. The organo substituent groups for the organohalosilane reactant have been discussed above, sufficiently stating that they are broadly selected from monovalent hydrocarbon radicals, halogenated monovalent hydrocarbon radicals and are more preferably selected from alkyl radicals of 1 to 10 carbon atoms, phenyl radicals and fluoroalkyl radicals of 1 to 10 carbon atoms.

Where the silicone resin is to be utilized for forming encapsulating films, as an additive or binder resin in the silicone resin molding composition or in the formation of silicone resin paints, preferably the organo groups are selected from methyl and phenyl. It is preferred that the final silicone resin product for these applications have methyltrifunctional siloxy units, phenyltrifunctional siloxy units, dimethyldifunctional siloxy units and diphenyldifunctional siloxy units. Generally, for these applications, the concentration of the methyltrifunctional siloxy units may vary anywhere from 5 to 20 mole percent by weight in the silicone resin; the concentration of phenylytrifunctional siloxy units may vary anywhere from 10 to 30 mole percent in the silicone resin the concentration of dimethyldifunctional siloxy units may vary anywhere from 20 to 60 mole percent and the concentration of the diphenyldifunctional siloxy units may vary anywhere from 15 to 45 mole percent; understandably, within this range of ratios the total mole concentration must add up to 100 mole percent and the concentration of organohalosilane reactants is selected so that the silicone resin will have the desired mole percent concentration in the final silicone resin product of methyltrifunctional siloxy units, phenyltrifunctional siloxy units, dimethyldifunctional siloxy units, and diphenyldifunctional siloxy units. One specific instance within the ranges disclosed above is that a preferred silicone product is produced containing from 8 to 10 mole percent of methyltrifunctional siloxy units, from 18 to 20 mole percent of phenyltrifunctional siloxy units and from 38 to 40 mole percent dimethyldifunctional siloxy units, and from 28 to 30 mole percent of diphenyldifunctional siloxy units.

It can be appreciated that the mixture of organohalosilanes irrespective of the presence of alkoxy groups or the presence of alcohol in the hydrolysis medium is selected such that the final silicone resin product will have the desired methyl and phenyl concentrations in the appropriate monofunctional and difunctional siloxy units. It should also be pointed out that if it is desired that the silicone resin product be alkoxylated or have a small portion of from 2 to 4 percent of alkoxy groups, it is not strictly necessary to utilize an alkoxylated organohalosilane reaction product as a reactant but these can be utilized as completely halogenated organohalosilane reactant where in there is added to the hydrolysis medium an aliphatic alcohol.

The addition of the organohalosilanes as stated previously is preferably carried out slowly so as to maintain the hydrolysis medium in the desired temperature range during the hydrolysis. Accordingly, while the organohalosilanes are added, the hydrolysis medium is continuously agitated until complete addition takes place, which may take place over a period of 30 minutes to 2 hours. Further, and desirably, the mixture is continuously stirred after the complete addition of the organohalosilanes to the hydrolysis medium for a period of 30 minutes to an hour. After this stirring period, there are formed two layers, an acid/water layer and an acetone/silicone resin hydrolyzate layer. The acid/water layer is removed to leave behind the acetone/silicone resin hydrolyzate layer. At this point, the novel aspect of the present process can be carried out in the bodying of the resin. Accordingly, in accordance with the instant disclosure there is added to the silicone resin acetone hydrolyzate at least 5% by weight of water based on the silicone resin hydrolyzate and preferably from 10 to 100% by weight of water based on the silicone resin hydrolyzate. It should be noted that more than 100% by weight of water can be added, however, it serves no useful purpose in this step of the instant process. Most preferably 40 to 80% by weight of water is added to the silicone resin hydrolyzate. At this point, the silicone resin hydrolyzate containing acetone and the water is simply heated to a temperature of at least 130° C and the heating is continued so as to elevate the temperature of the mixture and slowly drive off water. Generally, the mixture is heated anywhere from 130° C to up to 200° C slowly so as to gradually body the resin, while at the same time distilling off water and acetone.

It should be mentioned that the heating step should take place gradually over a period of 1 to 8 hours; it should also be mentioned that too rapid a heating of the mixture so as to raise the temperature to 200° C or above for a total period of time less than 1 or 3 hours of heating, will drive off the water too quickly resulting in the resin not being bodied. The presence of the water effects catalytic condensation in bodying the silicone resin over a period of time during such heating.

Accordingly, and preferably, it is desired to heat the reaction mixture at a temperature of at least 130° C to 140° C and to up to 180° C, but preferably no greater than 200° C, over a period of time from 2 to 8 hours and more preferably over a period of time from 4 to 8 hours. It should be noted that if the heating is continued for a period of time greater than 8 hours no useful purpose in the bodying step is served and the resin may be over bodied. If the heating is carried out at the appropriate temperatures given above then the resin will be sufficiently bodied by the end of an 8 hour period.

At the end of this heating period, most of the acetone and most of the water is driven off and the bodied silicone resin is ready to be utilized, with the exception of the fact that its acid content has to be decreased to below 5 parts per million. It is desirable to decrease the acid content of the silicone resin product to below 10 parts per million, and more preferably 5 parts per million or less otherwise the presence of the residual acid in the silicone resin will result in the degradation of the resin over a prolonged period of time especially for such applications where the silicone resin is used to form encapsulating films, silicone resin molding compounds or silicone resin paints. Accordingly, to reduce the acid content there is carried out a refluxing procedure.

The bodied silicone resin is cooled to at least 100° C or below and there is added to the hydrolyzate or as much as 100% or more of water. The amount of water that is added, even within the above ranges disclosed, is not critical. There is also added to the bodied silicone resin water from 0.05 to 0.3 parts of a water-immiscible organic solvent per part of said hydrolyzate. Again the amount of water solvent within the ranges disclosed above is not critical in the instant invention. It is sufficient to say there is added sufficient water and sufficient water solvent to create a desirable refluxing mixture for driving off the excess acid from the bodied silicone resin without curing or gelling the silicone resin.

It has been found that the addition of water within 10% to 100% by weight of silicone resin hydrolyzate and the addition of 0.05 to 0.3 parts of solvent per part by weight of said hydrolyzate is sufficient for this step in the process. Water-immiscible organic solvents that may be utilized, are any water-immiscible organic solvents such as xylene, toluene, benezene, chlorinated aliphatic solvents; aliphatic solvents such as cyclohexane, cycloheptane, cyclooctane, preferably along the disclosures of the instant invention an aliphatic solvent is utilized because it can be utilized with the resin in the final product where pollution might be a problem.

Accordingly, after this bodied silicone resin, water and solvent mixture has been prepared the mixture is simply heated to the reflux temperature of the solvent to drive off solvent, water and in addition the residual acid. Generally, such refluxing temperature does not exceed 130° C. Accordingly, this heating step is continued until all the water is driven off and if it is desired to have a 100% solids silicone resin, until all the solvent is driven off. This procedure is carried out in a period of time from anywhere from 1 to 4 hours. This step of adding water and water-immiscible solvent and refluxing the mixture of the bodied resin is carried out until the residual acid content of the silicone resin is 5 to 10 parts per million or less.

If it is desired to have a silicone resin of 100% solids then the water and solvent is simply driven off when the acid content has reached the desirable limits to produce a silicone resin within the instant invention which has a viscosity from 50,000 to 100,000 centipoise at 25° C.

If it is not desired to have a silicone resin at 100% solids then simply during the acid reducing steps, when the acid content is reduced to permissible levels the mixture is cooled to room temperature and sufficient solvent is added to the mixture; the same solvent preferably that was utilized in the refluxing technique to obtain a silicone resin with the desired solids content. If it is desired to utilize a different type of solvent then simply the 100% solids resin is dissolved in the solvent desired.

The silicone resin product produced by the instant process will be a silicone resin with the concentration of organo groups as defined above, where the organo/silicone ratio may vary anywhere from 1.0 to 1.9:1 where the silanol content varies from 2% to 4% by weight and which may optionally have an alkoxy content of 2% to 4% by weight. This silicone resin is extremely stable even at elevated temperatures and gives off few volatiles to the atmosphere prior to cure. It is also soluble in most aliphatic solvents making it a suitable silicone resin for applications that necessitate the need for solvents which must meet certain pollution standards.

Three most preferred utilizations of the silicone resin of the instant case are as intermediates in silicone paints, as a binder resin in silicone resin molding compounds and the production of encapsulating films. Such encapsulating films are produced by taking the silicone resin of the instant case and adding to it from 0.05% to 1% by weight of a metal salt of a carboxylic acid ranging from lead to manganese in the periodic table and heating the resulting mixture which is formed into a film at a temperature above 200° C for a period of time of anywhere from 10 minutes to 1 hour. The metal salt of a carboxylic acid simply functions as a catalyst to cure the silicone resin of the instant case. Preferably, tin salts such as tin octoate are preferred as catalysts for the curing of the silicone resins of the instant case.

The bodied silicone resin of the instant case can also be utilized as an ingredient in the production of silicone paints. The silicone resin of the instant case is simply mixed with the known polyesters that are utilized in paints at a concentration of 10 to 30% by weight of the polyester. There is added to the mixture, pigments, as well as catalysts for curing the paint or accelerating the curing of the paint and also the necessary solvents. Catalysts for the curing of the paint can be for example, metal salts of carboxylic acids where the metal can be any metal from lead to manganese in the periodic table in titanium catalysts.

The catalyst may be utilized at the same concentrations in silicone resins polyester paints, as is utilized in encapsulating films or even at smaller concentrations. These ingredients in the silicone polyester paints are simply mixed, as is well known in the paint industry, to produce a paint which will cure either at room temperature or cure very rapidly in elevated temperatures.

The bodied silicone resin of the instant case, can also be utilized to an advantage as an additive or binder resin in silicone resin molding compositions. Silicone resin molding compositions are usually composed of a binder resin which usually comprises a high silanol content silicone resin having anywhere from 4 to 12 mole percent silanol groups which has an organo to silicone ratio in the silicone resin of anywhere from 1.0 to 1.9:1. The organo groups may again be selected from any monovalent hydrocarbon radical and halogenated monovalent hydrocarbon radical.

To this binder resin there is added a filler which for instance may be calcium carbonate, zinc oxide or any other well known filler for silicone resin molding compositions, at a concentration of 5 to 100% by weight of the silicone binder resin. To this mixture, there may be added the instant bodied silicone resin as an additive to decrease the volatiles given off and to act as a plasticizng agent to the silicone resin molding composition. The bodied silicone resin of the instant case is utilized at a concentration of 5 to 50% by weight of the total silicone binder resin. It is also possible in accordance with the present invention to utilize as the total binder resin the silicone resin of the instant case. In spite of its low silanol content the instant resin has the advantage in that it will give off few volatiles during cure which results in a decrease of gas pockets formed in the molded part.

For such silicone resin molding compositions, it is well known to use the various types of catalysts which in one preferred case may comprise a mixture of metal salts of carboxylic acids where the metal is selected from lead to manganese in the periodic table in combination with lead compounds such as lead carbonates. Preferably the catalyst mixture is utilized at a concentration of 0.5 to 3% by weight of the silicone binder resin. The above utilization of the resin of the instant case is given for illustration purposes as well as disclosing various uses to which the silicone resin of the instant case can be put to. However, applicant does not wish to be understood that he is limiting the use of his silicone resin to only these disclosed applications since there are other uses.

The examples below are given for the purpose of illustrating the present invention and are not intended to be utilized for any purpose in defining the claims or limiting the definition of the invention in the claims as set forth in the instant disclosure. Parts in the example as well as the instant specification and claims are by weight.

EXAMPLE I

There was charged to a reaction flask equipped with a condenser, agitator and thermometer 6000 parts of water and 2000 parts of acetone. There was added to the mixture in the reaction flask a silane blend consisting of 212 parts of methyltrichlorosilane, 516 parts of phenyltrichlorosilane, 530 parts of dimethyldichlorosilane and 742 parts of diphenyldichlorosilane. The rate of addition was controlled for 50 minutes. The reaction temperature rose from 25° C to 70° C. The mixture was stirred for 30 minutes and allowed to settle for 15 minutes. After settling, the resin layer was drawn off and the upper acid/water layer discarded. Ten percent water based on resin solids was then added to the hydrolyzate. The mixture was heated and the water and residual acetone was atmospherically stripped off to 160° C. The resin was then cooled to 100° C. At this time 600 parts of toluene and 10% water was added to the resin. The mixture was heated to reflux and the water was trapped off. The resin solution was filtered through Celite and Fuller's Earth. The filtered resin was charged to a flask equipped with an agitator, condenser, thermometer and vacuum line. The resin was heated under vacuum and the solvent was removed to 130° C. The solventless resin was liquid at room temperature and had a viscosity of 51,000 centipoise.

A weight loss test was run on a sample of the resin at 250° C. After 150 hours there was only 16.5% weight loss in the sample. Compatability tests with organic resins showed that the polymer had an unusually wide compatability range. Bodied resins made from the same silane blend by prior art methods are incompatible with organic resins. A paint designed for high temperature applications was made and tested for hardness, flexibility, thermal shock resistance and heat stability. A film of the paint on a steel panel was heat-aged for 1000 hours at 250° C. The paint film had gloss retention, hardness, flexibility, thermal shock resistance and resistance to film cracking and crazing equal to bodied resin. The resin was found to be completely soluble in VM&P naphtha. It should be noted that prior art resins are not soluble in aliphatic solvents. The unusual solubility properties allow for adjusting the resin to a high solids solution for use in making non-air polluting paints under California Code Rule 66 and other similar state and city air pollution regulations.

EXAMPLE II

There was charged to a reaction flask equipped with a condenser, agitator and thermometer, 6000 parts of water and 2000 parts of acetone. Then there was added to the mixture in the reaction flask a silane blend consisting of 162 parts of methyltrichlorosilane, 458 parts of phenyltrichlorosilane, 558 parts of dimethyldichlorosilane and 822 parts of diphenyldichlorosilane. The rate of addition was controlled for 60 minutes. The reaction temperature rose from 30° C to 75° C. The mixture was stirred for 30 minutes and settled for 15 minutes. After settling, the resin layer was drawn off and the upper acid/water layer discarded. Ten percent water based on resin solids was then added to the hydrolyzate. The mixture was heated and the water and residual acetone was atmospherically stripped off to 160° C. The resin was cooled and adjusted to 90% solids with VM&P naphtha. The mixture was heated to reflux and the remaining water was trapped off. After this, the resin solution was cooled to 100° C. and then 10% water based on resin solids was charged to the resin solution. The mixture was heated to reflux and the water was trapped off to 175° C. After refluxing, an acid determination showed there was less than 10 parts per million HCL remaining. The resin was cooled and filtered through a mixture of Celite and Fuller's Earth. A weight loss test was run on a sample of the resin at 250° C and after 150 hours, there was only 18.9% weight loss. Compatibility tests with organic resins showed that the polymer had an unusually wide compatability range. It should be noted that bodied resins made from the same silane blend by prior art methods are incompatible with organic resins. A paint designed for high temperature applications was made and tested for hardness, flexibility, thermal shock resistance and heat stability. A film of the paint on a steel panel was heat-aged for 1000 hours at 250° C. The paint film had gloss retention, hardness flexibility, thermal shock resistance and resistance to film cracking and crazing equal to bodied resin. The resin was found to have a wide solubility range cut with VM&P naphtha.

EXAMPLE III

There was charged to a reaction flask equipped with an agitator, condenser and thermometer, 6000 parts of water and 1800 parts of acetone. There was added to the mixture in the reaction flask a silane blend consisting of 314 parts of methyltrichlorosilane and 530 parts of diphenyldichlorosilane in a dual feed with 1800 parts of acetone through a common dip leg. The rate of addition was controlled for 30 minutes while the reaction temperature rose from 25° C to 63° C. The peak reaction temperature was controlled below 65° C with external cooling. The mixture was stirred for 30 minutes and allowed to settle for 15 minutes. After settling, the resin layer was drawn off and the upper acid/water layer was discarded. Then 10% water based on resin solids was added to the hydrolyzate and the mixture was heated while the water and residual acetone was atmospherically stripped off to 160° C. The resin was adjusted to 90% solids with VM&P naphtha and heated to reflux and the remaining water was trapped off. The solution was cooled to 100° C and 10% water based on resin solids was charged to the resin. Then the mixture was heated to reflux and the water was trapped off to 175° C. The resin was cooled and filtered through a mixture of Celite and Fuller's Earth. A weight loss test was run on a sample of the resin at 250° C. After 150 hours there was only 15.3% weight loss. The resin made by prior art methods was found to have weight losses exceeding 40%. Although the resin contained less low molecular weight polymer, it was found to have the same compatibility range as the prior art resin with organic polymers.

I claim:

1. A process for the production of a bodied silicone resin without the use of a catalyst comprising (a) adding a organohalosilane to a homogeneous hydrolysis mixture where there is present per part or organohalosilane from at least 1.7 to 10 parts of water and from at least 0.2 to 5 parts of acetone and from 0 to about 1 mole of an aliphatic monohydric alcohol having from 1 to 8 carbon atoms, per mole of halogen attached to the silicone of the organohalosilane to produce a silicone resin hydrolyzate (b) separating the acid/water layer from the silicone resin hydrolyzate; (c) adding to the silicone resin hydrolyzate at least 5% by weight of water based on the silicone resin hydrolyzate; (d) heating the silicone resin hydrolyzate gradually for a period of time of 1 to 8 hours to at least 130° C; and (e) removing the water and acetone from the silicone resin hydrolyzate to leave the silicone resin; wherein said organohalosilane is selected from the group consisting of (1) organotrihalosilane (2) a mixture of organotrihalosilane and diorganodihalosilane, (3) a reaction product of an aliphatic monohydric alcohol having from 1 to 8 carbon atoms and a member selected from the class consisting of organotrihalosilane and a mixture of organotrihalosilane and diorganodihalosilane, which reaction product can have substituted an average of up to one alkoxy radical per halogen radical, (4) a mixture of the reaction product of (3) and a member selected from organotrihalosilane and diorganodihalosilane, and wherein the organo groups of said organohalosilane and the silicone resin are selected from the class consisting of monovalent hydrocarbon radicals, and halogenated monovalent hydrocarbon radicals.

2. The process of claim 1 wherein the amount of water added in step (c) is 10% to 100% by weight of the silicone resin hydrolyzate.

3. The process of claim 2 wherein in step (d) the silicone resin hydrolyzate is heated in the range of 140° C to 160° C.

4. The process of claim 3 wherein after step (d) and in conjunction with step (e) further comprising (f) adding to said silicone resin hydrolyzate from 10% to 100% by weight of water based on said hydrolyzate and from 0.05 to 0.3 parts of water-immiscible organic solvent per part by weight of said hydrolyzate and heating the mixture at the reflux temperature of said water-immiscible organic solvent until all water is removed and the said silicone resin has an acid content that does not exceed 5 parts per million.

5. The process of claim 4 wherein step (f) is repeated until the acid content of said silicone resin is less than 5 parts per million.

6. The process of claim 3 wherein step (c) and (d) are repeated until the silicone resin has an acid content that does not exceed 5 parts per million and until all water and acetone are removed from the silicone resin to yield the said silicone resin at 100% solids.

7. A silicone resin produced by the process of claim 1 having a silanol content of 2% to 4% by weight.

8. A silicone paint containing the silicone resin of claim 1.

9. A silicone molding and encapsulating composition containing the silicone resin of claim 1.

10. The silicone resin of claim 1 wherein said resin containing 10 mole percent of monomethylsiloxy units, 20 mole percent of monophenylsiloxy units, 40 mole percent of dimethylsiloxy units and 30 mole of diphenylsiloxy units.

11. The process of claim 4 wherein the water-immiscible organic solvents are selected from the class consisting of xylene, toluene and aliphatic solvents.

12. An encapsulating film composed of a silicone resin having a viscosity in the range of 40,000 to 100,000 centipoise which is produced by a process comprising (a) adding an organohalosilane to a homogeneous hydrolysis mixture where there is present per part of organohalosilane from at least 1.7 to 10 parts of water and from at least 0.2 to 5 parts of acetone and from 0 to about 1 mole of an aliphatic monohydric alcohol having from 1 to 8 carbon atoms per mole of halogen attached to the silicone of the organohalosilane to produce a silicone resin hydrolyzate; (b) separating the acid/water layer from the silicone resin hydrolyzate; (c) adding to the silicone resin hydrolyzate at least 5% by weight of water based on the silicone resin hydrolyzate; (d) heating the silicone resin hydrolyzate gradually for a period of time of 1 to 8 hours to at least 130° C; and (e) removing the water and acetone from the silicone resin hydrolyzate to leave the silicone resin wherein organohalosilane is selected from the group consisting of (1) organotrihalosilane; (2) a mixture of organotrihalosilane and diorganodihalosilane; (3) a reaction product of an aliphatic monohydric alcohol having from 1 to 8 carbon atoms and a member selected from the class consisting of organotrihalosilane, and a mixture of organotrihalosilane and diorganodihalosilane, which reaction product can have substituted an average of up to one alkoxy radical per halogen radical; (4) a mixture of the reaction product of (3) and a member selected from organotrihalosilane and diorganodihalosilane, and wherein the organo groups of said organohalosilane and the silicone resin are selected from the class consisting of monovalent hydrocarbon radicals, and halogenated monovalent hydrocarbon radicals.

13. The encapsulating film of claim 12 which is cured by the addition of 0.05% to 1% by weight based on the silicone resin of metal salt of a carboxylic acid, the metal being selected from the class consisting of lead to manganese in the periodic table, and heating the film above 200° C.

* * * * *